G. G. Cottrell,
Steel Trap,
Nº 55,245. Patented June 5, 1866.
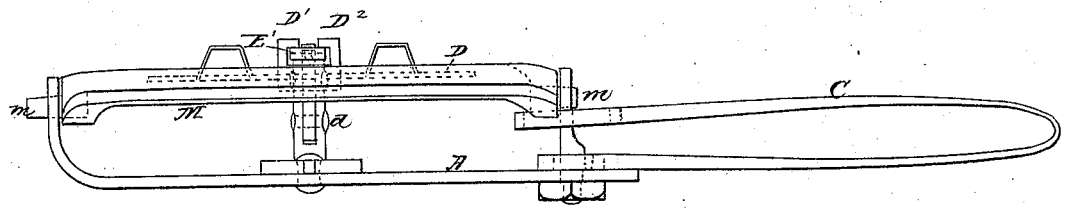
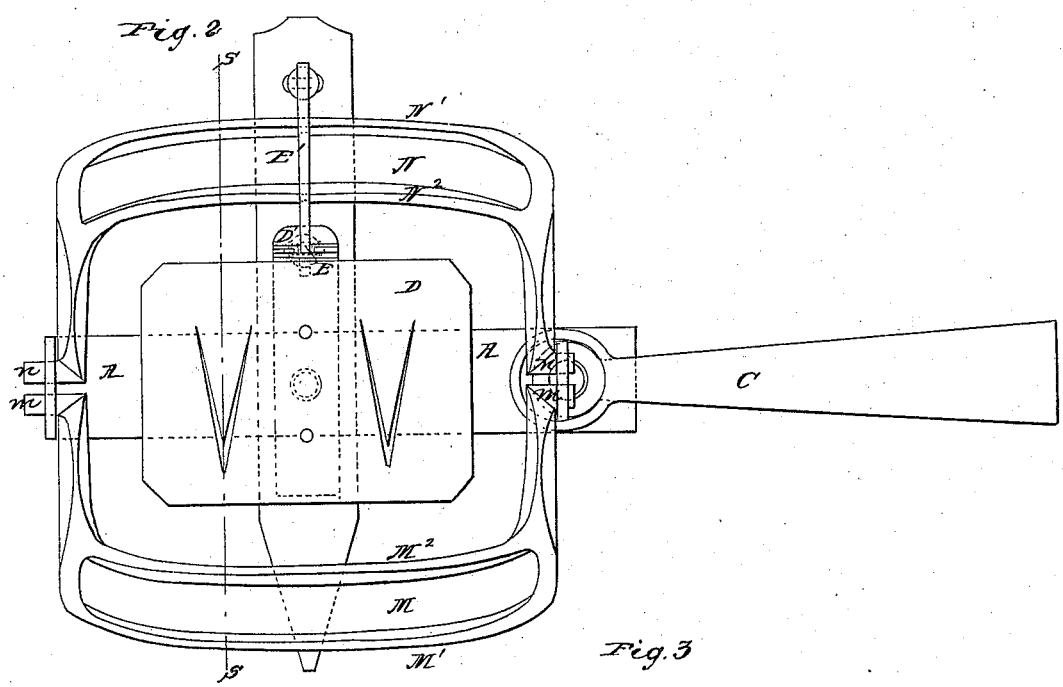
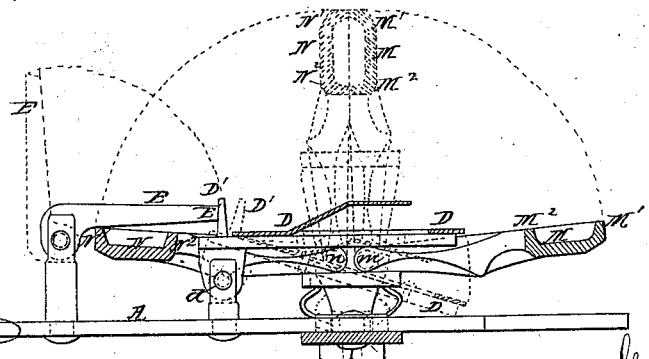
Witnesses
D. W. Stetson
D. L. Freeborn
Inventor
Geo. G. Cottrell
per J. D. Stetson Attorney

UNITED STATES PATENT OFFICE.

GEORGE G. COTTRELL, OF SHARON, CONNECTICUT.

IMPROVEMENT IN ANIMAL-TRAPS.

Specification forming part of Letters Patent No. 55,245, dated June 5, 1866.

*To all whom it may concern:*

Be it known that I, GEORGE G. COTTRELL, of Sharon, in the county of Litchfield and State of Connecticut, have invented certain new and useful Improvements in Animal-Traps; and I do hereby declare that the following is a full and exact description thereof.

My invention relates to that class of traps generally known as "steel traps," which seize the leg or other part of the animal and partially crush it. The improvements relate to certain modifications of the details.

I will first describe what I consider the best means of carrying out my invention, and will afterward designate the points which I believe to be new. The accompanying drawings form a part of this specification.

Figure 1 is a side elevation of the trap when set ready to be sprung. Fig. 2 is a plan view of the same. Fig. 3 is a cross-section on the line S S in Fig. 2.

The red outlines indicate the positions which the several parts assume after the trap has been sprung.

Similar letters of reference indicate like parts in all the figures. Tints are employed simply to distinguish parts, and do not indicate material. The material for the whole may be iron and steel.

A is the foundation or fixed frame; M and N the jaws turning on centers $m\ n$; and C is the spring. D is the pan, turning on a center, $d$. E is the lever which holds the jaws open. The jaws M and N are each, in fact, double jaws, or provided with two ridges on the inner face of the jaw, which seize the animal's leg at two points, instead of at one point, as is usual. The upper ridges are marked $M'\ N'$, and the lower ridges are marked $M^2\ N^2$.

The leg of an animal being seized by this trap at two points is more securely held than in ordinary traps. Animals frequently escape from ordinary traps in a mutilated condition by gnawing off the part of the limb which is below the jaw. It is supposed that the part becomes destitute of feeling after a little time, because the animal never gnaws above the point where it is griped by the trap.

My trap holds the animal firmly by the upper ridges, $M'\ N'$, after the animal has bitten off all that projects below the lower ridges, $M^2\ N^2$.

The jaws are so constructed that the animal cannot gain access to the portion between these ridges.

In setting the trap the spring C is pressed down, the jaws opened, and the lever E passed over one of the jaws, N, as usual. The pan D is now elevated into a horizontal position, and the narrow surface at the end of the lever E is allowed to catch against a corresponding narrow surface, $D'$, on the pan D. These parts are both constructed in a manner analogous to knife-edges, so that an elevation as well as a depression of the pan D will spring the trap.

It happens in practice that animals lift on the pan when it is baited and seized by the mouth, and it sometimes happens that an animal will succeed in disengaging the bait from the pan of an ordinary trap and leave it set. My construction and arrangement of the surfaces $D'$ and $E'$ prevent this. If the pan D is pressed down the trap is sprung as usual. If the pan D is pulled upward the trap is sprung with equal certainty by causing the knife-edges $E'$ to slip off on the opposite side of the knife-edges $D'$, allowing the lever E to fly upward through the opening or break $D^2$ on the pan. The sheet metal composing the main surface of the pan is cut in the form represented, so as to leave two points, which are bent upward, and then extended horizontally in the position represented. These points serve as very convenient means of securing the meat or other bait upon the trap. It is simply necessary to apply the meat on the edge of the pan and push it forcibly upon the points.

Having now fully described my invention, what I claim as new in steel traps, and desire to secure by Letters Patent, is as follows:

1. The double ridges or holding-jaws $M'\ N'\ M^2\ N^2$, arranged to operate substantially as and for the purpose herein specified.

2. The knife-edges or narrow bearings $D'\ E'$, arranged substantially in the manner and for the purpose herein set forth.

3. The spits formed on the pan D, substantially in the manner and for the purpose herein set forth.

GEORGE G. COTTRELL.

Witnesses:
ALBERT RAWLEY,
HIRAM WEED.